April 8, 1969  H. ALTMANN  3,438,039
SUPPORTING DEVICE FOR RADIO TELESCOPES
Filed July 18, 1966

Inventor:
Helmut Altmann
By Walter Becker

Inventor:
Helmut Altmann 3,438,039
SUPPORTING DEVICE FOR RADIO
TELESCOPES
Helmut Altmann, Rumeln-Kaldenhausen, Germany, assignor to Beteiligungs- und Patentverwaltungsgesellschaft mit beschrankter Haftung, Essen, Germany
Filed July 18, 1966, Ser. No. 565,819
Claims priority, application Germany, Aug. 19, 1965,
B 83,347
Int. Cl. H01g 3/02, 19/12, 15/14
U.S. Cl. 343—765                                    4 Claims

ABSTRACT OF THE DISCLOSURE

A radio telescope comprising a framework rotatable about a vertical axis and pivotally supporting a supporting basket with a main traverse and spaced pivots defining the axis of elevation of said basket, said supporting basket having a first supporting point on said traverse and also having a second supporting point arranged in spaced relationship to said first supporting point, and a reflector body supported by said first and second supporting points in such a way that the reflector axis extends through said two supporting points, said reflector body being prevented from turning about said reflector axis relative to said supporting basket.

---

The present invention relates to a supporting device for radio telescopes with a mirror body formed by radial girders or frames. With heretofore known supporting devices of the type involved, the mirror body, i.e. the supporting construction of the reflector surface, is directly connected to the elevation shaft. This construction has the drawback that when turning the mirror body about the elevational shaft, local deformations of the reflector surface will occur.

It is, therefore, an object of the present invention to provide such a supporting device for radio telescopes which will overcome the above mentioned drawback.

It is another object of this invention to provide a supporting device as set forth in the preceding paragraph, which will prevent any deformations of the mirror surface by local loads.

The objects of the present invention have been realized by supporting the mirror body solely at two points along the mirror axis on a separate supporting body. By mounting the mirror body in this way, deformations of the mirror surface by local loads are prevented and there remain only minor residual deformations which are caused by the radial symmetric weight proper of the mirror body itself.

According to a further development of the present invention, the first supporting point of the mirror body is formed by the intersection of the outer struts or arms along the conical mantle of the radial girders. The second supporting point is formed by the center point of a transverse disc which is formed of radial spokes and annular bracing in or near the elevational axis.

The supporting body itself advantageously comprises a main traverse extending along the elevational shaft and having connected thereto a central post and lateral bracing means of a triangular strengthening structure or trestle from whose corners a tripod extends to the supporting point which is laterally located with regard to the trestle plane. If desired, a further tripod may be connected to such supporting basket as outlined above for mounting the auxiliary mirror located in the focus of the main mirror.

The invention is illustrated by way of example in the accompanying drawings, in which.

Figure 1:
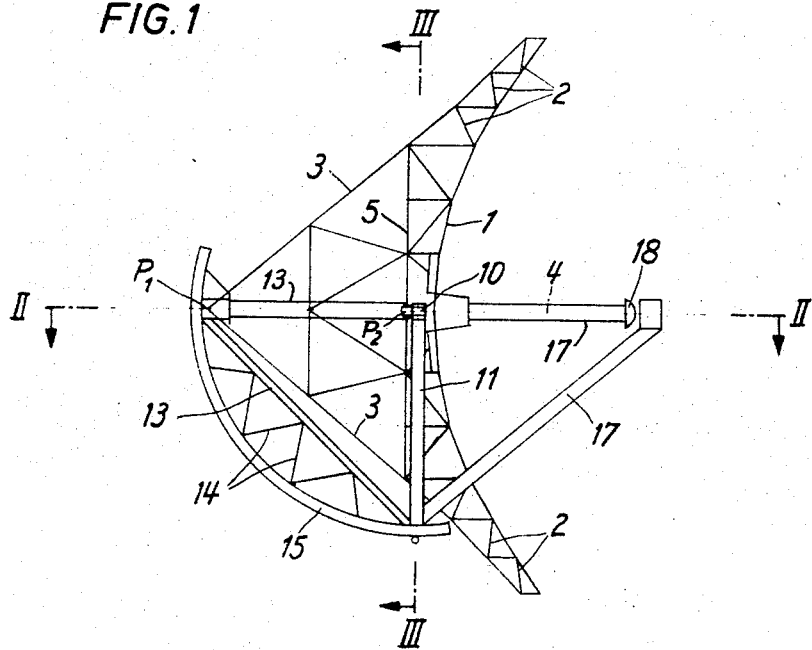
FIG. 1 is a vertical section through a device according to the present invention along the mirror axis and, more specifically, along line I—I of FIG. 2.
Figure 2:
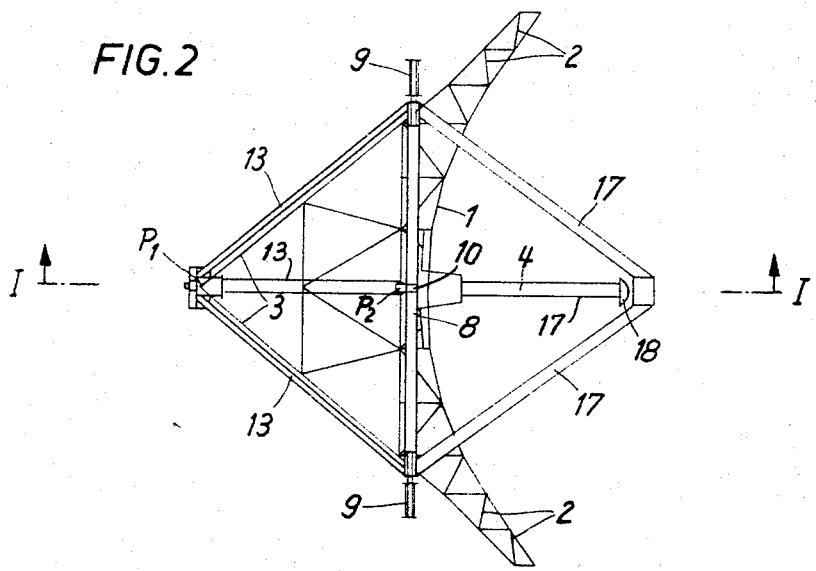
FIG. 2 is a horizontal section along the mirror axis, more specifically taken along the line II—II of FIG. 1.
Figure 3:
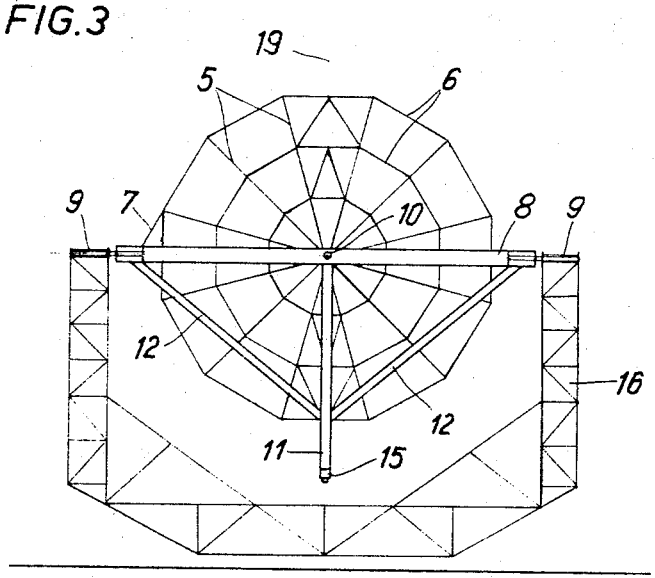
FIG. 3 is a vertical cross section through the mirror body as taken along the line III—III of FIG. 1.
Figure 4:
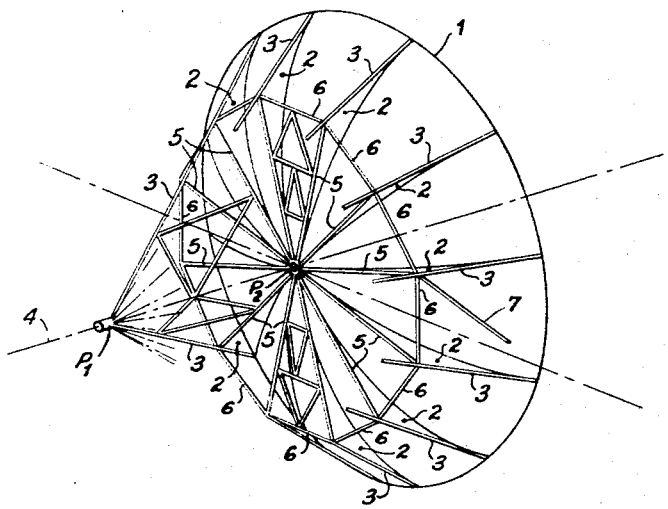
FIG. 4 is a perspective view showing the structure of the mirror.

Referring now more specifically to the drawings, the drawing generally shows a supporting device according to the invention for a radio telescope in a position in which the mirror axis is located horizontally. As will be seen from the drawing, the mirror body supports the reflector surface 1 and comprises twelve radially arranged girder discs 2 the outer struts or arms 3 of which conically converge at the supporting point $P_1$. The mirror body furthermore comprises a transverse disc which is built up of spokes 5 extending perpendicularly with regard to the mirror axis 4 from the struts 3 and converging at the supporting point $P_2$. Finally, the transverse disk also comprises annularly arranged bracing means 6 connected between struts 3 and the outer ends of spokes 5. The mirror body is by means of a so-called stabilizer bar 7 prevented from rotating about the mirror axis 4.

The supporting basket comprises a main traverse 8 with bearing studs 9 of the elevation shaft. The stabilizer bar 7 extending from the bracing means 6 is connected to the traverse 8 adjacent one end.

In the center of the main traverse 8, at the pivot 10 forming the supporting point $P_2$, the forces from the spokes 5 of the transverse discs closely adjacent thereto are absorbed.

In the particular location of the mirror body shown in the drawing, the load acting upon the pivot 10 is through a triangular trestle conveyed to the bearing studs 9 of the main traverse 8, said triangular trestle being composed of a bend-resistant central post 11 and lateral bracing means 12 extending from the post 11 to the ends of the traverse 8.

From the corners of this trestle a tripod comprises three struts 13 extending from the post 11 and extremities of traverse 8 to the supporting point $P_1$ at which the outer arms 3 of the mirror body converge. Post 11 is additionally connected to supporting point $P_1$ by means of a framework disc 14 on which in a manner known per se there is mounted a gear segment 15 of the elevation drive.

The supporting basket is by means of the bearing studs 9 supported by a framework 16 which in its turn is rotatable in a manner known per se about a vertical axis 19, the so-called azimuth axis.

Connected to the ends of the main traverse 8 and post 11 are posts 17 of a tripod converging to a point on the axis 4 for supporting the auxiliary mirror 18.

It is, of course, to be understood that the present invention is, by no means, limited to the particular construction shown in the drawings but also comprises any modifications within the scope of the appended claims.

What I claim is:

1. A radio telescope which includes: a framework, means rotatably supporting said framework for rotation about a vertical axis, a supporting basket having a main traverse with bearing pivots defining the axis of elevation for said supporting basket, said supporting basket being journalled by its pivots in said framework for turning about said axis of elevation, said supporting basket having a first supporting point located on said main traverse and also having a second supporting point arranged in spaced relationship to said main traverse, means connected to said supporting basket and operable to turn the latter about said axis of elevation, a reflector body comprising a concave reflector surface and traverse disc means defining a plane substantially perpendicular to the axis of said reflector body, said reflector body also comprising a plurality of girder discs the central planes of which intersect said reflector body axis, said reflector body being supported by said first and second supporting points in such a way that the reflector axis extends through said supporting points, and stabilizing bar means connected to said main traverse and said reflector body for preventing the latter from turning about said reflector axis relative to said supporting basket.

2. A radio telescope according to claim 1, in which the girder discs include outer struts defining the mantle of a cone the tip of which coincides with said second supporting point.

3. A radio telescope according to claim 1, in which said supporting basket in addition to said main traverse comprises a post extending downwardly from the central portion of said main traverse, two bracing members connecting different portions of said main traverse with said post, and three struts having one end thereof connected to said second supporting point, the other end of two of said struts being connected to spaced portions of said main traverse whereas the other end of the third strut is connected to the lower end of said post.

4. A radio telescope according to claim 1 which includes a tripod connected to said supporting basket, and an auxiliary mirror located in the focus of said concave reflector surface and connected to said tripod and through the latter also to said supporting basket.

References Cited

UNITED STATES PATENTS 2,719,921   10/1955   Cairnes _____ 343—882 XR
2,971,736   2/1961   Enneper.

CHANCELLOR E. HARRIS, Primary Examiner.

R. P. SEITTER, Assistant Examiner.

U.S. Cl. X.R.

248—487; 343—837, 912